United States Patent Office 2,977,210
Patented Mar. 28, 1961

2,977,210

BIOLOGICALLY ACTIVE ARALKYLHALIDES

Kenneth L. Godfrey, St. Albans, W. Va., assignor to Monsanto Chemical Company, St. Louis, Mo., a corporation of Delaware No Drawing. Filed Apr. 29, 1957, Ser. No. 655,496

11 Claims. (Cl. 71—2.3)

This invention relates to biologically active aralkyl halides and to methods of pest control employing them.

The invention includes methods of destroying or controlling undesired vegetation, fungi and other pests and relates to biologically active compositions for such purposes. More particularly, it relates to methods of controlling undesired vegetation and other pests which comprise applying thereto an effective concentration of certain halogen substituted aralkyl halides hereafter described. While halogenated benzenes, toluenes and xylenes have been proposed as carriers for pesticides, the class herein disclosed are primary toxicants, although they too may be used in conjunction with other active ingredients if desired.

It has been found that a composite chlorination product prepared by chlorinating toluene in the ring until the gain in weight corresponds to that calculated for trichlorotoluene, then chlorinating in the side chain until the gain in weight corresponds to that calculated for trichlorobenzyl chloride, possesses outstanding biological activity. Bromine may replace chlorine in these products. They possess both pre-emergence and foliage contact herbicidal properties. The composite mixture is markedly superior to any component known to be present.

It appears that ortho substituted halogen is desirable. Ortho-chlorobenzyl chloride exerts significant herbicidal activity in pre-emergence application at dosages of 25 pounds per acre whereas para-chlorobenzyl chloride is inactive under these conditions. Neither compound is effective as a foliage spray at 0.5% concentration. However, the introduction of a second nuclear halogen and preferably a third but not more than three produces greater utility as herbicides.

In general, the polyhalogen benzyl halides which possess significant pesticidal properties conform to the structure

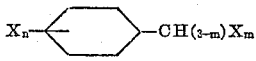

where X represents the same or different halogen, preferably chlorine or bromine although fluorine and iodine may be substituted, $n$ is an integer from 1 to 5 and $m$ is an integer from 1 to 3. Apparently mixtures of these compounds exert synergistic action.

Examples of the toxicants comprise

α-2,6-trichlorotoluene,
α-chloro-2,6-dibromotoluene,
α-2,4,5-tetrachlorotoluene,
α-chloro-2,4,5-tribromotoluene,
α-2,4,5-tetrabromotoluene,
α-2,4,6-tetrachlorotoluene,
α-chloro-2,4,6-tribromotoluene,
α-bromo-2,4,6-trichlorotoluene,
α-2,3,6-tetrachlorotoluene,
α-bromo-2,3,6-trichlorotoluene,
α-chloro-2,3,6-tribromotoluene,
α-2,3,4-tetrachlorotoluene,
α-2,3,5-tetrachlorotoluene,
α-3,4,5-tetrachlorotoluene.

Although the trichlorobenzyl halides are phytotoxic, the introduction of more than three chlorine atoms in the ring generally reduces activity. Similarly, the introduction of more halogen in the side chain reduces activity and may eliminate it altogether.

The new toxicants may be applied conveniently in the form of a spray containing the active ingredient in a concentration within the range of 0.1% to 10% by weight. Thorough coverage of the foliage is effective for contact killing. For pre-emergence control of plants amounts within the range of 5–100 pounds per acre comprise a range useful for most purposes. Weeds from the following plant families are controlled to varying degrees: Leguminaseae, Cucurbitaceae, Umbelliferae, Chenopodiaceae, Amaranthaceae, Convolvulaceae and Aizoaceae. At concentrations within the range of 35–100 pounds per acre the compositions comprise soil sterilants which destroy all plant life as well as some animal pests.

The toxicants are generally liquid products emulsifiable in water and preferably are applied in this form. As dispersing and wetting agents to aid in the formation of dispersions and emulsions there may be mentioned soft or hard sodium or potassium soaps, alkylated aromatic sodium sulfonates such as sodium dodecyl benzene sulfonate, or an amine salt of dodecyl benzene sulfonic acid, alkali metal salts of sulfated fatty alcohols, ethylene oxide concentration products of alkyl phenols, tall oil or higher alkyl mercaptans.

The table below illustrates the use of the polyhalobenzyl halides as contact herbicides. The material was emulsified in water by the aid of an emulsifying agent and applied as a spray containing the concentration of the active ingredients shown. The spray was applied to the foliage of grass, to the foliage of bean plants and to the foliage of a mixture of broadleaf plants and the effects recorded. For convenience in recording the data the following rating key was used:

No phytotoxicity _____ 0
Slight phytotoxicity _____ 1
Moderate phytotoxicity _____ 2
Severe phytotoxicity _____ 3
Plant dead _____ 4

In Table I below the product designated α,ar,ar,ar-tetrachlorotoluene was the composite reaction product obtained by the following procedure: Substantially 1500 parts by weight of dry toluene was charged into a chlorinator of suitable capacity. Substantially 15 parts by weight of iron filings were added as catalyst carrier for ring chlorination and chlorine introduced at about 20° C. During the last part of the run the temperature was increased to about 70° C. in order to keep the reaction mixture fluid and the flow of chlorine continued until the increase in weight corresponded to that calculated for trichlorotoluene. Thus, when the product analyzed 54.8% chlorine, the flow of chlorine was interrupted and the trichlorotoluene given a 10% caustic wash and filtered through a bed of clay in order to remove the iron. Alternatively, the iron may be removed by distillation of the chlorinated product. The product was then chlorinated at 160° C. in the presence of ultra violet light until the gain in weight was that calculated for trichlorobenzyl chloride. Analysis of the product for chlorine at this point gave 61.8%.

Table I

| Active Ingredient | Conc., Percent | Phytotoxicity Rating | | |
|---|---|---|---|---|
| | | Grass | Bean | Broadleaf |
| α,2,6-Trichlorotoluene | 0.5 | 3 | 2 | 3+ |
| α,2,4,5-Tetrachlorotoluene | 0.5 | 2+ | 3 | 3+ |
| α,2,4,6-Tetrachlorotoluene | 0.5 | 4 | 3+ | 3+ |
| α,2,3,6-Tetrachlorotoluene | 0.5 | 2 | 2+ | 3+ |
| α,3,4-Trichlorotoluene | 0.5 | 2 | 2 | 3+ |
| α,ar,ar,ar-Tetrachlorotoluene | 0.3 | 1 | 3 | 2 |

As illustrative of the use as a pre-emergence herbicide, α,ar,ar,ar-tetrachlorotoluene was applied to the ground of seeded plots before any plants had emerged. The data are recorded in Table II.

Table II

| Plant | Phytotoxicity Rating at— | | |
|---|---|---|---|
| | 40 Lbs./Acre | 20 Lbs./Acre | 10 Lbs./Acre |
| Morning glory | 3 | 3 | 3 |
| Wild oats | 1 | 1 | 1 |
| Brome-cheat grass | 3 | 3 | 2 |
| Rye grass | 3 | 3 | 3 |
| Buckwheat | 3 | 3 | 3 |
| Radish mustard | 3 | 3 | 3 |
| Sugar beet | 3 | 3 | 3 |
| Cotton | 3 | 3 | 2 |
| Corn | 2 | 0 | |
| Fox tail | 3 | 3 | 3 |
| Barnyard grass | 3 | 3 | 2 |
| Crab grass | 3 | 3 | 2 |
| Field bindweed | 3 | 3 | 2 |
| Pigweed | 3 | 3 | 3 |

Further biological activity was demonstrated by observing the effect to aquatics organism of α,ar,ar,ar-tetrachlorotoluene. At a concentration of 5 parts per million it was severely toxic to coontail (Ceratophyllum) and killed guppies and snails. Moreover, application of 0.2% spray to plants infested with 2-spotted mites resulted in a 75% contact kill. However, the composition is only slightly toxic from the standpoint of oral ingestion. The oral lethal dose to rats ($LD_{50}$) was 3.3 grams per kilogram.

Although the new toxicants are liquid products it is possible to formulate dry compositions by absorbing them on finely divided powdered carriers as for example talc, clay, pyrophyllite, silica and fuller's earth. They may be applied as dusts or further diluted with liquid carriers.

α-2,4,6-tetrachlorotoluene was prepared by adding chlorine to 723 grams of 2,4,6-trichlorotoluene M.P. 33–34° C. The trichlorotoluene was placed in a flask equipped with a stirrer, condenser, thermometer and a bubbler tube and heated to 90° C. at which temperature 132 grams of chlorine were added over a 2½ hour period. It was necessary to supply a small amount of heat to hold the temperature between 190–198° C. during chlorination. The product was then fractionated and α-2,4,6-tetrachlorotoluene collected as a colorless liquid, boiling point of 123–126° C. at 8 mm. Hg.

In a similar manner, α-2,3,6-tetrachlorotoluene was prepared by introducing 98 grams of chlorine into 546 grams of 2,3,6-trichlorotoluene M.P. 41–42° C. at a temperature of 190–198° C. The product was collected as a colorless liquid by fractional distillation B.P. 132–135° C. at 10 mm. Hg.

α-2,3,4-tetrachlorotoluene was prepared by light catalyzed chlorination of 2,3,4-trichlorotoluene. 283 grams of 2,3,4-trichlorotoluene was heated to 180° C. and then with a sun lamp placed 8 to 10 inches from the pot 50 grams of chlorine added over 40 minutes at 180–200° C. The product was distilled in vacuo to yield α-2,3,4-tetrachlorotoluene as a colorless liquid boiling point of 137–142° C. at 10 mm. Hg. α-2,3,5-tetrachlorotoluene prepared by light catalyzed chlorination of 2,3,5-trichlorotoluene at 140–160° C. was also a liquid B.P. of 137–141° C. at 10 mm. Hg.

It is intended to cover all changes and modifications of the examples of the invention herein chosen for purposes of disclosure which do not constitute departures from the spirit and scope of the invention.

What is claimed is:

1. A method of controlling vegetation which comprises applying thereto a phytotoxic concentration, up to 100 pounds per acre of a phytotoxic compound conforming to the structure

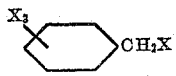

and mixtures thereof, where X represents halogen.

2. A method of controlling vegetation which comprises applying thereto a phytotoxic concentration, up to 100 pounds per acre of a compound conforming to the structure

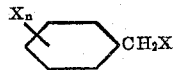

and mixtures thereof, where X is a halogen of atomic weight at least 35 but not more than 80 and n is 3.

3. A method of controlling vegetation which comprises applying thereto a phytotoxic concentration, up to 100 pounds per acre, of a compound of the structure

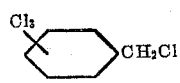

and mixtures thereof.

4. The method of claim 3 where the composition is applied to the ground before the plants emerge.

5. A method of controlling vegetation which comprises applying to the soil medium before plants to be destroyed emerge a phytotoxic concentration, up to 100 pounds per acre, of mixed isomers of chlorinated toluene containing an average of three chlorine atoms in the carbocyclic ring and one in the side chain.

6. A method of controlling vegetation which comprises applying to the soil medium before the plants to be destroyed emerge a phytotoxic concentration, up to 100 pounds per acre, of α-2,3,4-tetrachlorotoluene.

7. A method of controlling vegetation which comprises applying to the soil medium before the plants to be destroyed emerge a phytotoxic concentration, up to 100 pounds per acre, of α-2,3,5-tetrachlorotoluene.

8. A method of controlling vegetation which comprises applying to the soil medium before the plants to be destroyed emerge a phytotoxic concentration, up to 100 pounds per acre, of α-bromotrichlorotoluene in which all of the chlorine is in the carbocyclic ring.

9. A method of controlling vegetation which comprises applying to the soil medium before the plants to be destroyed emerge a phytotoxic concentration, up to 100 pounds per acre, of α,2,3,6-tetrachlorotoluene.

10. A method of controlling vegetation which comprises applying thereto a phytotoxic concentration, up to 100 pounds per acre, of α-2,6-trichlorotoluene.

11. A method of controlling vegetation which comprises applying to the foliage thereof a phytotoxic concentration, up to 100 pounds per acre, of α-3,4-trichlorotoluene.

References Cited in the file of this patent

UNITED STATES PATENTS 2,422,769  Blake et al. _____ June 24, 1947

FOREIGN PATENTS 289,002  Switzerland _____ June 16, 1953

OTHER REFERENCES

Frear: "Catalogue of Insecticides and Fungicides," vol. 1, 1947, pages 163 and 164.

"J. Amer. Water Works Assn.," February 1946, pages 195 and 196.

Cook et al.: "Chemical Weed Killers," Bulletin No. 18, National Research Council of Canada, Ottawa, Canada, 1937, 111 pages, page 91 of interest.

Gibbons in "Water Works and Sewerage," May 1940, page 231.

Beron et al. in "Chemical Abstracts," vol. 46, col. 4724 to 4725, 1952.

Leonard et al. in "Southern Weed Conference, 3rd Proceedings," February 1950, page 91.

Simonet et al. in "C. R. Societe de Biologie," vol. 131, 1939, pages 222 to 224 inclusive.